(12) United States Patent
Sui et al.

(10) Patent No.: US 11,586,631 B2
(45) Date of Patent: Feb. 21, 2023

(54) DATABASE OPTIMIZATION USING RECORD CORRELATION AND INTERMEDIATE STORAGE MEDIA

(71) Applicant: International Business Machines Corporation, Armonk, NY (US)

(72) Inventors: Guang Han Sui, Beijing (CN); Peng Hui Jiang, Beijing (CN); Jia Tian Zhong, Beijing (CN); Jun Su, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/343,878

(22) Filed: Jun. 10, 2021

(65) Prior Publication Data
US 2022/0398250 A1      Dec. 15, 2022

(51) Int. Cl.
*G06F 7/00*      (2006.01)
*G06F 16/2455*   (2019.01)
*G06F 16/28*     (2019.01)
*G06F 11/14*     (2006.01)
*G06F 11/20*     (2006.01)
*G06F 11/34*     (2006.01)

(52) U.S. Cl.
CPC .... *G06F 16/24561* (2019.01); *G06F 11/1451* (2013.01); *G06F 11/2023* (2013.01); *G06F 11/3452* (2013.01); *G06F 16/285* (2019.01)

(58) Field of Classification Search
CPC ............. G06F 16/24561; G06F 16/285; G06F 11/1451; G06F 11/2023; G06F 11/3452

USPC .................................................. 707/600–899
See application file for complete search history.

(56) References Cited

U.S. PATENT DOCUMENTS

| 8,745,033 | B2 | 6/2014 | Day et al. |
| 8,909,996 | B2 | 12/2014 | Srinivasan et al. |
| 9,189,506 | B2 | 11/2015 | Gao et al. |
| 10,983,992 | B1 | 4/2021 | Ferez Lafon et al. |
| 2004/0221118 | A1* | 11/2004 | Slater ...................... G06F 21/10 711/163 |

(Continued)

OTHER PUBLICATIONS

International Searching Authority, PCT/CN2022/093282, IEE220391PCT, Aug. 16, 2022.

*Primary Examiner* — Isaac M Woo
(74) *Attorney, Agent, or Firm* — Garg Law Firm, PLLC; Rakesh Garg; Rakesh Roy

(57) ABSTRACT

An embodiment includes deriving usage data associated with records of a database by monitoring requests to perform read operations on the records of the database. The embodiment generates record correlation data representative of correlations between respective groups of records of the database by parsing the usage data associated with the records of the database. The embodiment stores a plurality of records received as respective write requests during a first time interval in an intermediate storage medium. The embodiment identifies a correlation in the record correlation data between a first record of the plurality of records and a second record of the plurality of records. The embodiment selects, responsive to identifying the correlation, a first location in the database for writing the first record and a second location in the database for writing the second record based on a proximity of the first location to the second location.

20 Claims, 8 Drawing Sheets

(56) References Cited

U.S. PATENT DOCUMENTS

| | | |
|---|---|---|
| 2017/0053357 A1 | 2/2017 | Bowman et al. |
| 2018/0181627 A1 | 6/2018 | Cichosz et al. |
| 2019/0171755 A1 | 6/2019 | Yanez et al. |
| 2019/0288850 A1 | 9/2019 | Beecham et al. |
| 2020/0192893 A1 | 6/2020 | Eltabakh et al. |

* cited by examiner

DATABASE OPTIMIZATION USING RECORD CORRELATION AND INTERMEDIATE STORAGE MEDIA

BACKGROUND

The present invention relates generally to a method, system, and computer program product for database management. More particularly, the present invention relates to a method, system, and computer program product for database optimization using record correlation and intermediate storage media.

In general, a database is a collection of data organized in a manner that enables operations such as searching and sorting the data. In the context of computing environments and systems, data can be generally encompassing of all forms of information that can be stored as values on a computer readable medium (e.g., memory, hard disk). Data, and in particular, one or more instances of data, can also be referred to as a data object. A data object is a region of storage that contains a value or group of values. Each value can be accessed using its identifier or a more complex expression that refers to the object. In addition, each object has a unique data type. The data type of an object determines the storage allocation for that object and the interpretation of the values during subsequent access Data can be stored in a database for various reasons and to serve various entities or "users." Generally, data stored in the database can be used by the database users. A user of a database can, for example, be a person, a database administrator, or a computer program or process designed to interact with a database.

A database program or database management system (DBMS) is an executable computer program that can interact with data, for example, retrieve and display data based on a read request. Generally, database systems have evolved over the years to include increasingly complex capabilities. For example, some databases in use today can support several users simultaneously providing complex queries. Also, today's DBMSs can manage any form of data including text, images, sound and video. Every database is built slightly differently, with distinctions that involve performance optimizations, handling edge cases, or architectural decisions.

A DBMS may handle a variety of requests from multiple applications using a client/server model, where database system instances act as servers and the applications are treated as clients. Client requests arrive in the form of queries and are interpreted by a query processor that parses and interprets the queries. Such queries typically involve creating, reading, updating, or deleting data in a database.

Today, databases have become prevalent in virtually all aspects of business and personal life. Generally, databases and DBMS that manage them can be very large and extremely complex partly in order to support an ever increasing need to store data and analyze data. For example, some databases store vast amounts of data that is distributed among multiple storage devices (e.g., optical disks and/or solid state disks). Over time, as the amount of data in a database increases, records that are frequently accessed together will often be distributed in multiple locations, sometimes across multiple disks in one or more geographic locations. For example, an employee database that include records of employee names, job titles, and departments may frequently receive employee name queries that also query the employee's job title and department records. When these records are stored in disparate places, the database performance is negatively impacted due to an increased amount of time required to access multiple locations for the name, job title, and department records.

SUMMARY

The illustrative embodiments provide for database optimization using record correlation and intermediate storage media. An embodiment includes deriving usage data associated with records of a database by monitoring requests to perform read operations on the records of the database. The embodiment also includes generating record correlation data representative of correlations between respective groups of records of the database by parsing the usage data associated with the records of the database. The embodiment also includes storing a plurality of records received as respective write requests during a first time interval in an intermediate storage medium. The embodiment also includes identifying a correlation in the record correlation data between a first record of the plurality of records and a second record of the plurality of records. The embodiment also includes selecting, responsive to identifying the correlation, a first location in the database for writing the first record and a second location in the database for writing the second record based on a proximity of the first location to the second location. Other embodiments of this aspect include corresponding computer systems, apparatus, and computer programs recorded on one or more computer storage devices, each configured to perform the actions of the embodiment.

In some embodiments, the deriving of usage data comprises collecting statistics indicative of usage patterns associated with respective groups of records, wherein each usage pattern includes a record attribute of a corresponding group of records. In some such embodiments, at least one of the usage patterns includes a frequency at which records of a corresponding group of records are accessed together. In some such embodiments, the generating of record correlation data comprises calculating strength values for respective usage patterns. In some embodiments, the calculating of each strength value is based at least in part on whether the record attribute of the respective usage pattern includes a key value. The strength value advantageously provides a metric that can be used to resolve correlation conflicts for records that have correlations with several unrelated records.

Some embodiments include storing the usage patterns and associated strength values in a usage pattern repository on a computer readable storage medium. In some such embodiments, the identifying of the correlation in the record correlation data comprises searching the usage patterns in the usage pattern repository for record attributes applicable to both the first record and the second record. The use of usage patterns to identify correlations advantageously results in records being stored together that are regularly accessed together, thereby improving database performance.

Some embodiments include allocating a buffer in a computer readable storage medium, wherein the intermediate storage medium comprises the buffer. Some embodiments include allocating a portion of a computer readable storage medium as a virtual disk, wherein the intermediate storage medium comprises the virtual disk. Some embodiments include writing failover records as a failover copy of the plurality of records from the intermediate storage medium to a failover memory prior to writing the plurality of records to database files, wherein the failover memory comprises a computer readable storage medium. Some such embodiments include detecting a database error involving at least one record having a corresponding failover record in the failover memory, and advantageously are able to resolve the database error using the corresponding failover record.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
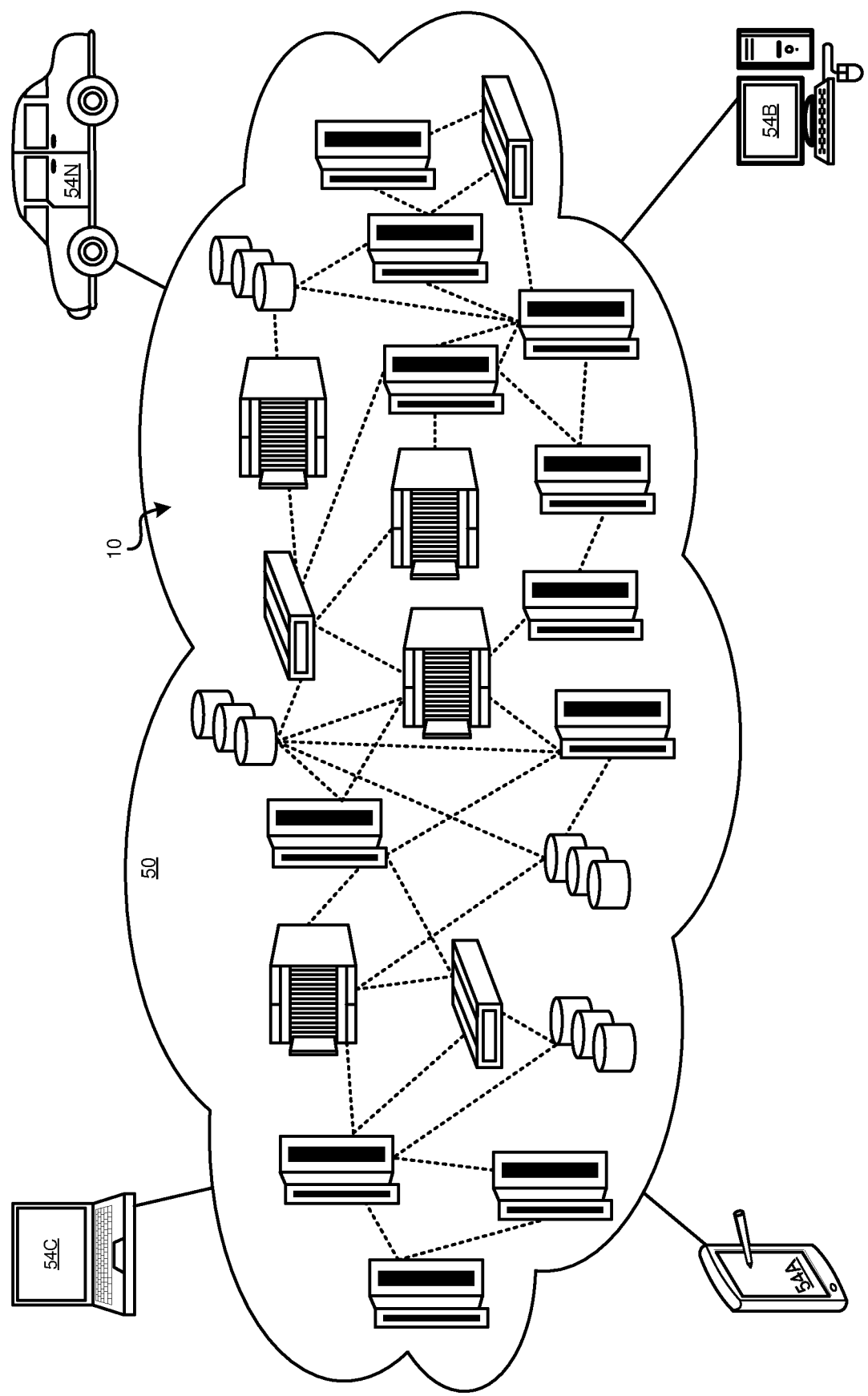
FIG. 1 depicts a cloud computing environment according to an embodiment of the present invention.

A database management system (DBMS) generally stores data in the form of data records that includes multiple data fields. The data records are stored as data files that are partitioned into pages, which may have the size of one or more disk blocks and may include data files that collectively span one or more disks. New records are generally not required to follow any particular order, particularly in write-heavy workloads. In such cases, new records are often placed in a write order, i.e., in order on a disk or disks according to the order in which associated write commands are received. Index files that store metadata associated with the records also store location information for the records and are therefore used to locate records that have been written to one or more disks.

While an approach that stores records in write-order offers benefits for write performance, handling subsequent queries associated with such records can be costly. For example, a new record may be written to a database that has a strong correlation with one or more other records that are stored in other blocks or on other disks. The physical distance between records increases access time. In a busy database that handles thousands of queries per second, even a small increase in access time becomes significant when it is applicable to such a large number of queries. Thus, such writer-order data storage present a technical problem in that it allows for efficient handling of write queries in write-heavy systems, but results in costly operations when accessing disparately-stored data that is often accesses together, thus requiring an undesirable trade-off of diminished read or update performance for the benefit of efficient write performance.

To address these technical problems, disclosed embodiments introduce an intermediate storage medium that collects data records destined to be written to a database. An intermediate storage medium, as used herein, is a computer readable storage medium and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. The intermediate storage medium allows the records to be reorganized from write order before being written to a final data file of the database.

An illustrative embodiment evaluates the records stored in the intermediate storage medium to identify correlations between two or more of the records. The records are then reordered and stored in the database in groups of correlated records. Since such correlated records are often accessed together, e.g., via read or update queries, storing them in close proximity to each other reduces the cost of such queries compared to querying such records that are disparately located.

A correlation, as used herein, is an interdependence or association between two or more records that are quantitative or qualitative in nature and may or may not involve a causal relationship between the records. In some embodiments, a correlation between two or more records is detected based on usage patterns in data queries. In some such embodiments, a group of data records that have repeatedly been retrieved together in response to a query or in response to a plurality of queries that are time-wise in close proximity to each other are designated as being correlated data records. As a non-limiting example, in an embodiment, a detected usage pattern is based on a key column of a clustered index that is frequently used by a sort operation such that records with the same value in the key column will frequently be accessed together. Thus, for the following Structured Query Language (SQL) definition, the records with the same username are likely to be accessed together, so such records are identified as having a correlation:

```
CREATE TABLE table name(username PRIMARY
    KEY,email, . . . )SELECT*FROM DB WHERE
    username='user a'
```

Also, in some embodiments, a correlation between data records is characterized based on a perceived strength of the correlation. In such embodiments, a given record may have two or more detected correlations with different data records that are disparately stored. In such a situation, a correlation conflict arises between the two or more detected correlations for the given record when determining where to store the given record. In such embodiments, the respective strengths of the two or more correlations are compared and the given record is stored in close proximity to other records associated with the strongest of the correlations.

An illustrative embodiment of a database optimization application, the application derives usage data associated with records of a database by monitoring requests to perform read operations on the records of the database. In some embodiments, the application receives and parses read requests. In some embodiments, the parsing includes performing one or more checks to determine the validity of a read request, such as a syntax check to determine if the read request has proper syntax, and/or a semantic check to determine if the read request is meaningful (e.g., determine if a table named in the request exists). In some such embodiments, the application determines database elements involved in the request, such as table names, data fields, key values, etc., for deriving the usage data.

In some embodiments, the application generates record correlation data representative of correlations between the records of the database by parsing the usage data associated with the records of the database. In some embodiments, the correlations include interdependence or associations between two or more records that are quantitative or qualitative in nature and may or may not involve a causal relationship between the records. In some embodiments, application detects correlations based on the derived usage data. In some embodiments, the application derives the usage data by collecting statistics indicative of usage patterns associated with groups of records.

In some such embodiments, the usage patterns include one or more record attributes that serve as the basis for the detected correlation. For example, in some embodiments, a usage pattern includes a frequency at which a group of records are accessed together or proximate to each other in a recognizable pattern. Thus, in some such embodiments, a group of data records that have repeatedly been retrieved together in response to a query or in response to a plurality of queries that are time-wise in close proximity to each other are designated as being correlated data records.

Also, in some embodiments, the application characterizes correlations between data records based on a perceived correlation strength. In such embodiments, a given record may have two or more detected correlations with different data records that are disparately stored. In such a situation, a correlation conflict arises between the two or more detected correlations for the given record when determining where to store the given record. In such embodiments, the respective strengths of the two or more correlations are compared and the given record is stored in close proximity to other records associated with the strongest of the correlations.

In some embodiments, the application stores the usage patterns associated with the detected correlations in a usage pattern repository on a computer readable storage medium. In some embodiments, the application also stores strength values associated with the detected correlations in the usage pattern repository.

In some embodiments, the application stores a plurality of records received as respective write requests during a first time interval in an intermediate storage medium. In some embodiments, the application receives and parses the write requests. In some embodiments, the parsing includes performing one or more checks to determine the validity of a write request, such as a syntax check to determine if the read request has proper syntax, and/or a semantic check to determine if the read request is meaningful (e.g., determine if a table named in the request exists). The application then writes the record associated with the write request to the intermediate storage media.

In some embodiments, the application allocates a buffer in a computer readable storage medium for use as the intermediate storage medium. In some embodiments, the application allocates a portion of a computer readable storage medium as a virtual disk for use as the intermediate storage media.

In some embodiments, the application identifies a correlation in the correlation data between a first record of the plurality of records and a second record of the plurality of records. In some embodiments, as records are written to the intermediate storage media, the application searches the usage pattern repository for correlations that apply to the records stored in the intermediate storage media. In some embodiments, the application identifies correlations in the usage pattern repository by searching the usage patterns in the usage pattern repository for record attributes that are applicable to two or more of the records stored in the intermediate storage media. As the application identifies correlations that apply to the records stored in the intermediate storage media, the application organizes the applicable records into groups.

In some embodiments, the application determines whether any correlation conflicts exist in which a record is correlated with more than one group of other records. If so, the application resolves any detected correlation conflicts based on designated usage attribute of the usage data. In some embodiments, the designated usage attribute of the usage data is used to calculate a perceived strength of the correlation. In such embodiments, the respective strengths of the two or more correlations are compared and the record is stored in close proximity to other records associated with the strongest of the correlations.

In some embodiments, the application selects locations in the database for writing each of the records stored in the intermediate storage medium such that, for each group of records having an identified correlation, the records within that group are stored in close proximity to each other. In some embodiments, during a second time interval that immediately follows the first time interval, the application moves the records that were stored in the intermediate storage medium during the first time interval to the database. The application writes the records to the database in groups according to the identified correlations. For example, in some embodiments the application selects locations in the database for storing grouped records such that the grouped records will be stored in close proximity to each other. In other words, the application selects locations for grouped records based on a proximity of each of the selected locations to each other so as to store the correlated records in close proximity to each other in the database.

In some embodiments, the application also provides failover functionality. In such embodiments, the application copies each record written to the intermediate storage media to failover memory as a failover copies of the records. In such embodiments, the application monitors the database for errors. If the application detects a database error involving records having a failover copy in the failover memory, the application resolves the database error by providing the corresponding failover copy of the affected record(s) to the database. In some embodiments, the failover memory comprises a computer readable storage medium. In some embodiments, the application writes the failover copies to the failover memory during the first time interval as records are written to the intermediate storage media. In alternative embodiments, the application writes the failover copies to the failover memory during the second time interval as records are written to the database.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
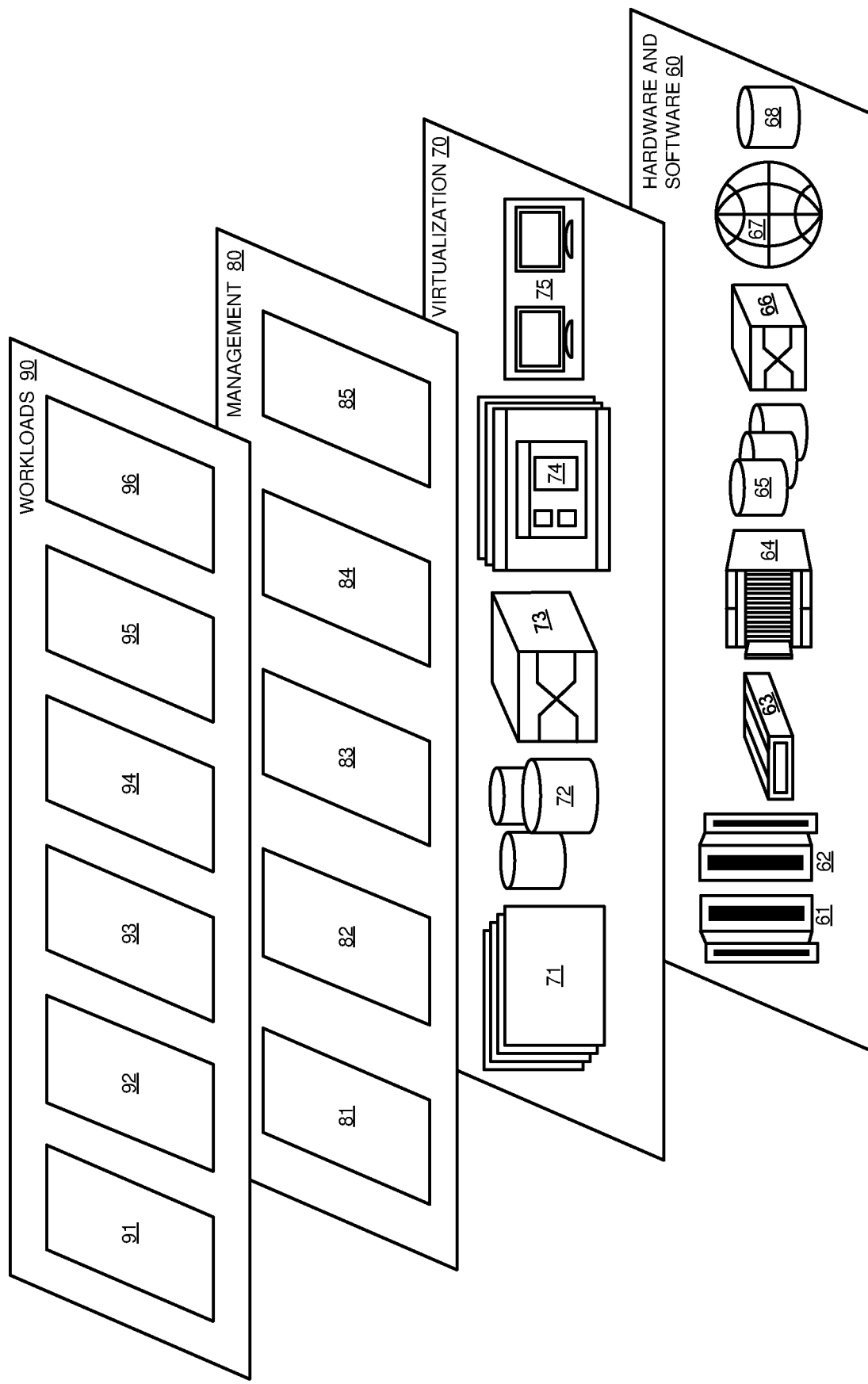
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data correlation processing 96.

Figure 3:
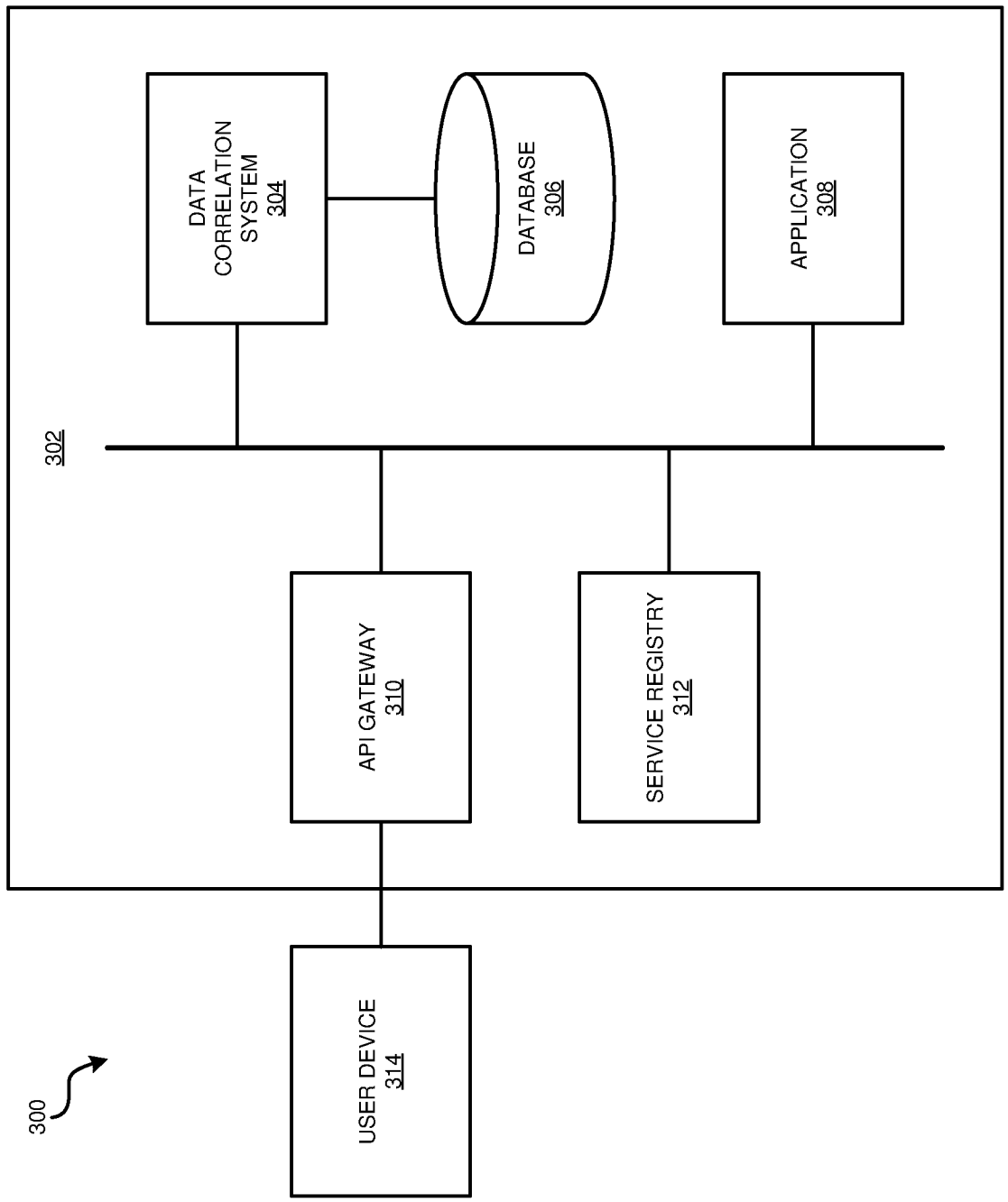
FIG. 3 depicts a block diagram of an example cloud computing environment in accordance with an illustrative embodiment.

With reference to FIG. 3, this figure depicts a block diagram of an example cloud computing environment 300 in accordance with an illustrative embodiment. In the illustrated embodiment, the cloud computing environment 300 includes service infrastructure 302 that provides services and service instances to one or more user devices 314, including data correlation services from data correlation system 304 and database services from database 306, directly or indirectly through an application 308. In some embodiments, the data correlation system 304 is deployed in workloads layer 90 of FIG. 2. By way of example, in some embodiments, the data correlation system 304 provides data correlation processing 96 in FIG. 2.

In the illustrated embodiment, the user device 314 communicates with service infrastructure 302 across one or more networks via an Application Programming Interface (API) gateway 310. In some embodiments, the service infrastructure 302 uses a distributed microservice architecture. In some such embodiments, the database 306 is a microservices-based database that runs as a distributed database across one or more servers. In some embodiments, the data correlation system 304 and the application 308 are microservices-based applications that run as distributed systems across one or more servers. In various embodiments, service infrastructure 302 and its associated data correlation system 304, database 306, and application 308 serve multiple users and multiple tenants. A tenant is a group of users (e.g., a company) who share a common access with specific privileges to the software instance. Service infrastructure 302 ensures that tenant specific data is isolated from other tenants.

In some embodiments, user device 314 connects with API gateway 310 via any suitable network or combination of networks such as the Internet, etc. and uses any suitable communication protocols such as Wi-Fi, Bluetooth, etc. Service infrastructure 302 may be built on the basis of cloud computing. API gateway 310 provides access to client applications like data correlation system 304, database 306, and application 308. API gateway 310 receives service requests issued by client applications, and creates service lookup requests based on service requests. As a non-limiting example, in an embodiment, the user device 314 executes a routine to initiate a request to the application 308, which in turn issues one or more queries to the database 306 via the data correlation system 304.

In the illustrated embodiment, service infrastructure 302 includes a service registry 312. In some embodiments, service registry 312 looks up service instances of the data correlation system 304, the database 306, and/or the application 308 in response to a service lookup request such as one from API gateway 310 in response to a service request from user device 314. For example, in some embodiments, the service registry 312 looks up service instances of the data correlation system 304, the database 306, and/or the application 308 in response to related requests from the user device 314.

In some embodiments, the service infrastructure 302 includes one or more instances of the data correlation system 304, database 306, and/or application 308. In some such embodiments, each of the multiple instances of the data correlation system 304, database 306, and/or application 308 run independently on multiple computing systems. In some such embodiments, the data correlation system 304, the database 306, and the application 308, as well as other service instances of the data correlation system 304, the database 306, and the application 308, are registered in service registry 312.

In some embodiments, service registry 312 maintains information about the status or health of each service instance including performance information associated each of the service instances. For example, as described in more detail herein, such performance information may include various types of performance characteristics of a given service instance (e.g., cache metrics, etc.). As described in more detail herein, extended service registry 312 ranks service instances based on their respective performance characteristics, and selects top-ranking service instances for service discovery or service lookup requests. In the event that a service instance becomes unresponsive or, unhealthy, the service registry will no longer provide its address or information about this service instance to other services.

Figure 4:
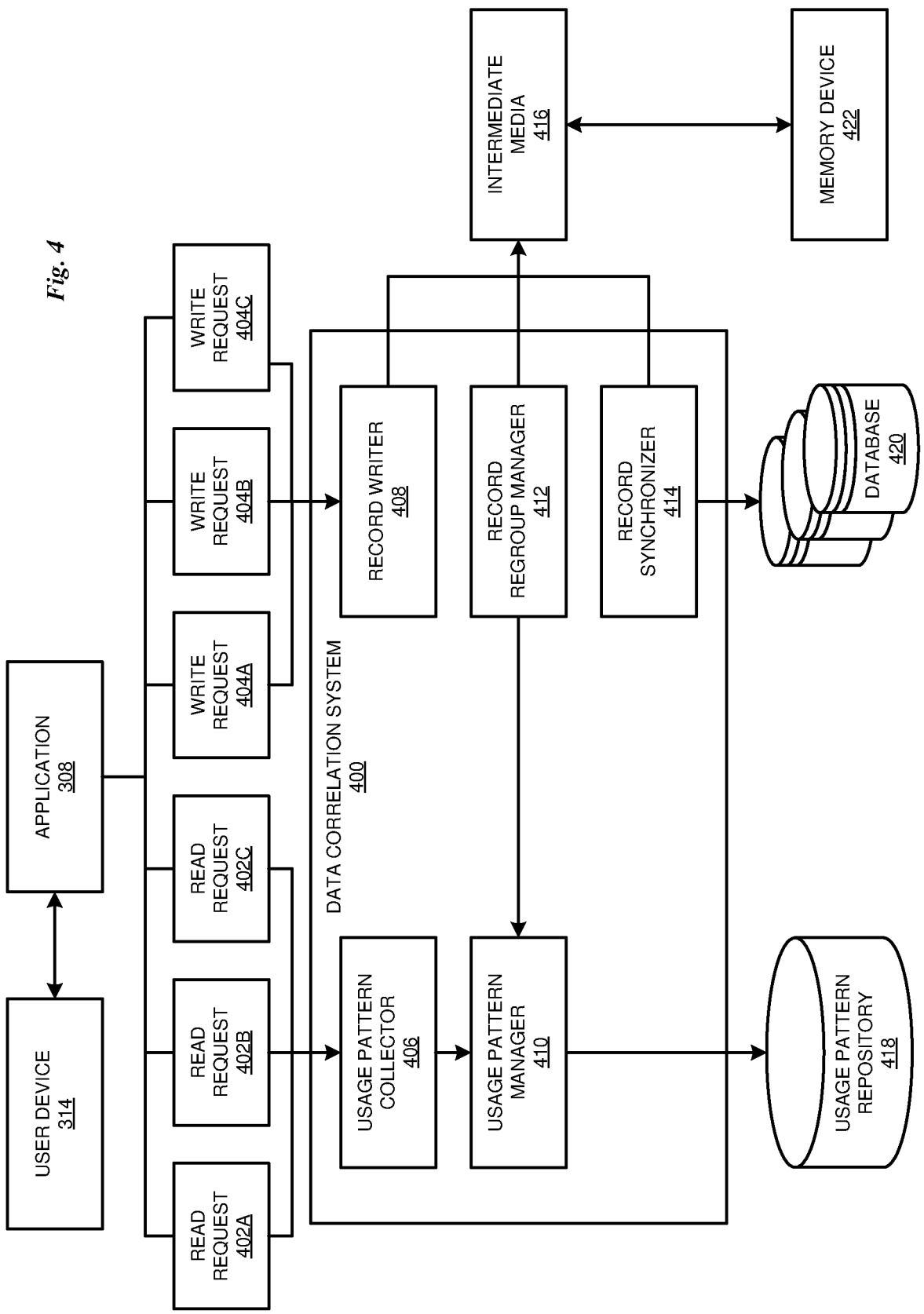
FIG. 4 depicts a block diagram of a data correlation system for optimizing write locations for a database in accordance with an illustrative embodiment.

With reference to FIG. 4, this figure depicts a block diagram of a data correlation system 400 for optimizing write locations for a database 420 in accordance with an illustrative embodiment. In a particular embodiment, data correlation system 400 is an example of data correlation system 304 of FIG. 3 and database 420 is an example of database 306 of FIG. 3.

In some embodiments, the data correlation system 400 includes a usage pattern collector 406, a usage pattern manager 410, a record writer 408, a record regroup manager 412, and a record synchronizer 414. In alternative embodiments, the data correlation system 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the data correlation system 400 receives database queries from an application 308 responsive to user commands from a user device 314. The data correlation system 400 automatically monitors the database queries, which include read requests, shown generally as read requests 402A-402C, and write requests, shown generally as write requests 404A-404C. The data correlation system 400 identifies correlations between data records based on the read requests 402A-402C. While three read requests are shown, actual implementations may identify correlations based on hundreds or thousands of read requests. The data correlation system 400 also receives write requests, shown generally as write requests 404A-404C, and temporarily stores data records associated with the write requests 404A-404C in intermediate storage media 416. While three write requests are shown, actual implementations may temporarily store hundreds or thousands of write requests. The data correlation system 400 optimizes storage locations in the database 420 for writing data records associated with the write requests 404A-404C by grouping the temporarily stored data records for storage in the database 420 based on the identified correlations.

In the illustrated embodiment, the usage pattern collector 406 receives and parses the read requests 402A-402C. For example, in some embodiments, the usage pattern collector 406 performs one or more checks to determine the validity of a read request, such as a syntax check to determine if the read request has proper syntax, and/or a semantic check to determine if the read request is meaningful (e.g., determine if a table named in the request exists). In some embodiments, the usage pattern collector 406 determines database elements involved in the request, such as table names, data fields, key values, etc. The usage pattern collector 406 then passes the parsed request to the usage pattern manager 410.

In the illustrated embodiment, the usage pattern manager 410 derives usage data associated with records of the database 420 by monitoring the parsed requests received from the usage pattern collector 406. The usage pattern manager 410 generates record correlation data representative of correlations identified between groups of two or more records of the database 420. In some embodiments, the correlations include interdependence or associations between two or more records that are quantitative or qualitative in nature and may or may not involve a causal relationship between the records. In some embodiments, the usage pattern manager 410 detects correlations based on the derived usage data. In some embodiments, the usage pattern manager 410 derives the usage data by collecting statistics indicative of usage patterns associated with groups of records.

In some such embodiments, the usage patterns include one or more record attributes that serve as the basis for the detected correlation. For example, in some embodiments, a usage pattern includes a frequency at which a group of records are accessed together or proximate to each other in a recognizable pattern. Thus, in some such embodiments, a group of data records that have repeatedly been retrieved together in response to a query or in response to a plurality of queries that are time-wise in close proximity to each other are designated as being correlated data records. As a non-limiting example, in an embodiment, a detected usage pattern is based on a key column of a clustered index that is frequently used by a sort operation such that records with the same value in the key column will frequently be accessed together. Thus, for the following SQL definition, the records with the same username are likely to be accessed together, so such records are identified as having a correlation:

```
CREATE TABLE table name(username PRIMARY
    KEY,email, . . . )SELECT*FROM DB WHERE
    username='user a'
```

Also, in some embodiments, the usage pattern manager 410 characterizes correlations between data records based on a perceived correlation strength. In such embodiments, a given record may have two or more detected correlations with different data records that are disparately stored. In such a situation, a correlation conflict arises between the two or more detected correlations for the given record when determining where to store the given record. In such embodiments, the respective strengths of the two or more correlations are compared and the given record is stored in close proximity to other records associated with the strongest of the correlations.

In the illustrated embodiment, the usage pattern manager 410 stores the usage patterns associated with the detected correlations in a usage pattern repository 418. In some embodiments, the usage pattern repository 418 is stored on a computer readable storage medium. In some embodiments, the usage pattern manager 410 also stores strength values associated with the detected correlations in the usage pattern repository 418.

In the illustrated embodiment, the record writer 408 receives and parses the write requests 404A-404C. For example, in some embodiments, the record writer 408 performs one or more checks to determine the validity of a write request, such as a syntax check to determine if the read request has proper syntax, and/or a semantic check to determine if the read request is meaningful (e.g., determine if a table named in the request exists). In the illustrated embodiment, the record writer 408 then writes the record associated with the write request to intermediate storage media 416.

In some embodiments, the data correlation system 400 allocates a buffer in a computer readable storage medium for use as the intermediate storage medium 416. In some embodiments, the data correlation system 400 allocates a portion of a computer readable storage medium as a virtual disk for use as the intermediate storage media 416.

In the illustrated embodiment, during a first time interval, the record writer 408 receives write requests 404A-404C. Responsive to the write requests 404A-404C, the record writer 408 performs the corresponding write operations to the intermediate storage media 416 rather than directly to the database 420. As records are written to the intermediate storage media 416, the record regroup manager 412 searches the usage pattern repository 418 for correlations that apply to the records stored in the intermediate storage media 416. In some embodiments, the record regroup manager 412 identifies correlations in the usage pattern repository 418 by searching the usage patterns in the usage pattern repository 418 for record attributes that are applicable to two or more of the records stored in the intermediate storage media 416. As the record regroup manager 412 identifies correlations that apply to the records stored in the intermediate storage media 416, the record regroup manager 412 organizes the applicable records into groups. The groups organize the records in preparation for storage in the database 420 so that correlated records will be grouped together. Storing the correlated records together in the database 420 will improve read and update performance compared to prior systems in which correlated records are disparately stored.

In some embodiments, the length of the first time interval is based on a designated period of time. In alternative embodiments, the first time interval varies depending on an amount of time that elapses until one or more conditions are met. For example, in some embodiments, the length of the first time interval depends on an amount of time that elapses until the intermediate media 416 is full or a designated percentage of the intermediate media 416 is full.

In the illustrated embodiment, a second time interval immediately follows the first time interval. During the second time interval, the record synchronizer 414 moves the records that were stored in the intermediate storage medium 416 during the first time interval to the database 420. The record synchronizer 414 writes the records to the database 420 in groups according to the correlations identified by the record regroup manager 412. For example, in some embodiments the record synchronizer 414 selects locations in the database 420 for storing grouped records such that the grouped records will be stored in close proximity to each other. In other words, the record synchronizer 414 selects locations for grouped records based on a proximity of each of the selected locations to each other so as to store the correlated records in close proximity to each other in the database 420.

In some embodiments, the data correlation system 400 also provides failover functionality. In such embodiments, each record written to the intermediate storage media 416 is copied to the memory device 422 as a failover copy of that record. In such embodiments, the data correlation system 400 monitors the database 420 for errors. If the data correlation system 400 detects a database error involving records having a failover copy in the memory device 422, the data correlation system 400 resolves the database error by providing the corresponding failover copy of the affected record(s) to the database 420.

In some embodiments, the memory device 422 comprises a computer readable storage medium and serves as a failover memory. In some embodiments, the failover copies are written to the memory device 422 during the first time interval as records are written to the intermediate storage media 416. In alternative embodiments, the failover copies are written to the memory device 422 during the second time interval as records are written to the database 420.

Figure 5:
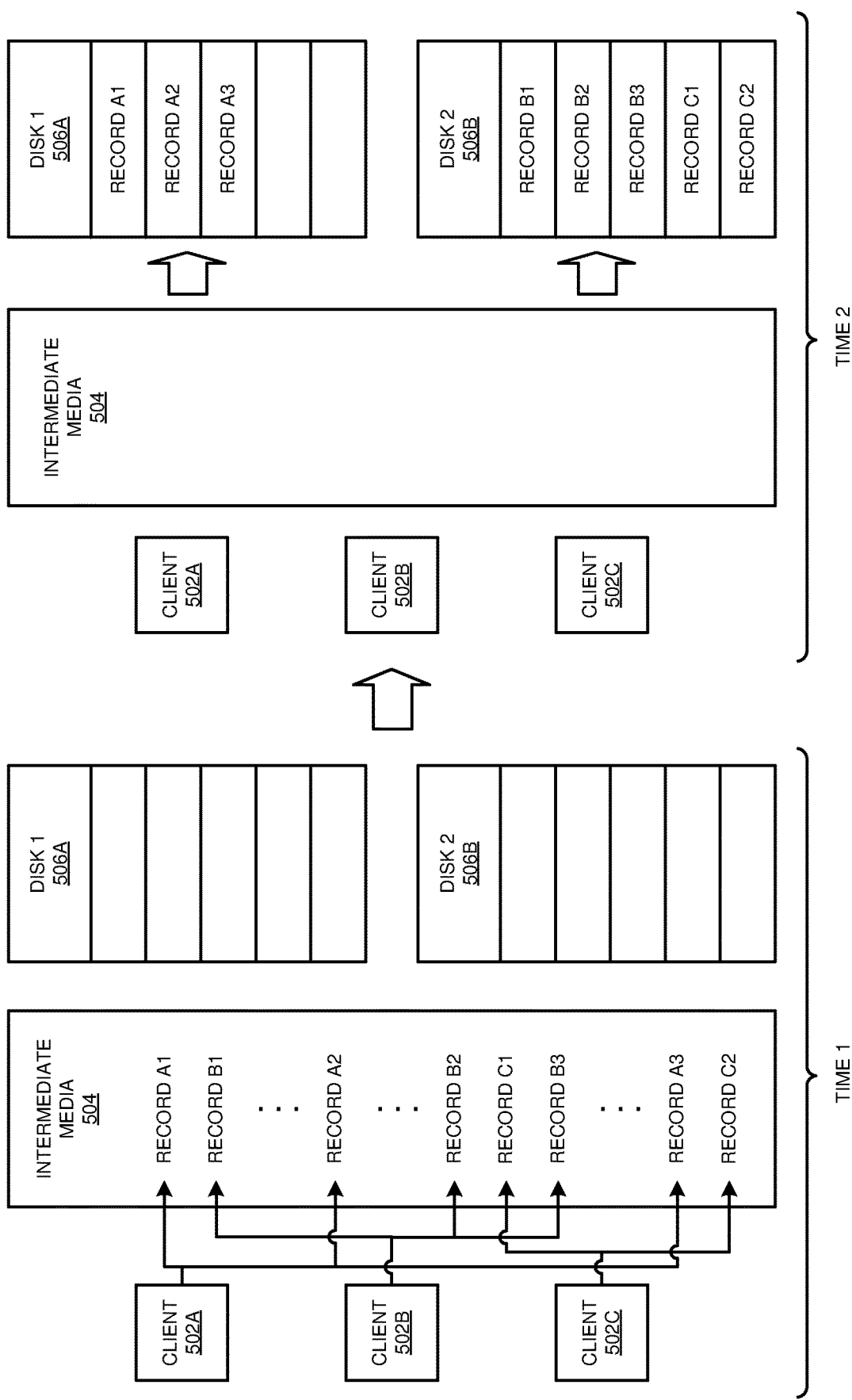
FIG. 5 depicts a block diagram of write operations performed by the data correlation system during first and second time intervals in accordance with an illustrative embodiment.

With reference to FIG. 5, this figure depicts a block diagram of write operations performed by the data correlation system 400 during first and second time intervals in accordance with an illustrative embodiment. In a particular embodiment, clients 502A-502C are examples of applications 308 of FIG. 3, intermediate media 504 is an example of intermediate storage media 416 of FIG. 4, and disks 506A-506B are examples of data storage locations for the database 420 of FIG. 4.

In the illustrated embodiment, during the first time interval shown as TIME 1, the data correlation system 400 receives write requests from clients 502A-502C. Responsive to the write requests, the data correlation system 400 performs the corresponding write operations by writing records A1-A3, B1-B3, and C1-C2 to the intermediate storage media 504 rather than directly to the database disks 506A-506B. As records are written to the intermediate storage media 504, the record regroup manager 412 of FIG. 4 searches for correlations that apply to the records stored in the intermediate storage media 504 and organizes the correlated records into groups. In the illustrated embodiment, the record regroup manager 412 identifies a correlation between records A1-A3, identifies a correlation between records B1-B3, and identifies a correlation between records C1 and C2.

In the illustrated embodiment, during the second time interval shown as TIME 2, the data correlation system 400 moves the records from the intermediate storage medium 504 to the database disks 506A-506B. As illustrated, the data correlation system 400 writes the records to the disks 506A-506B in groups according to the correlations identified during the first time interval. Thus, the data correlation system 400 selects locations on the database disk 506A for storing records A1-A3 together, selects locations on the database disk 506B for storing records B1-B3 together, and selects locations on the database disk 506B for storing records C1-C2 together.

Figure 6A:
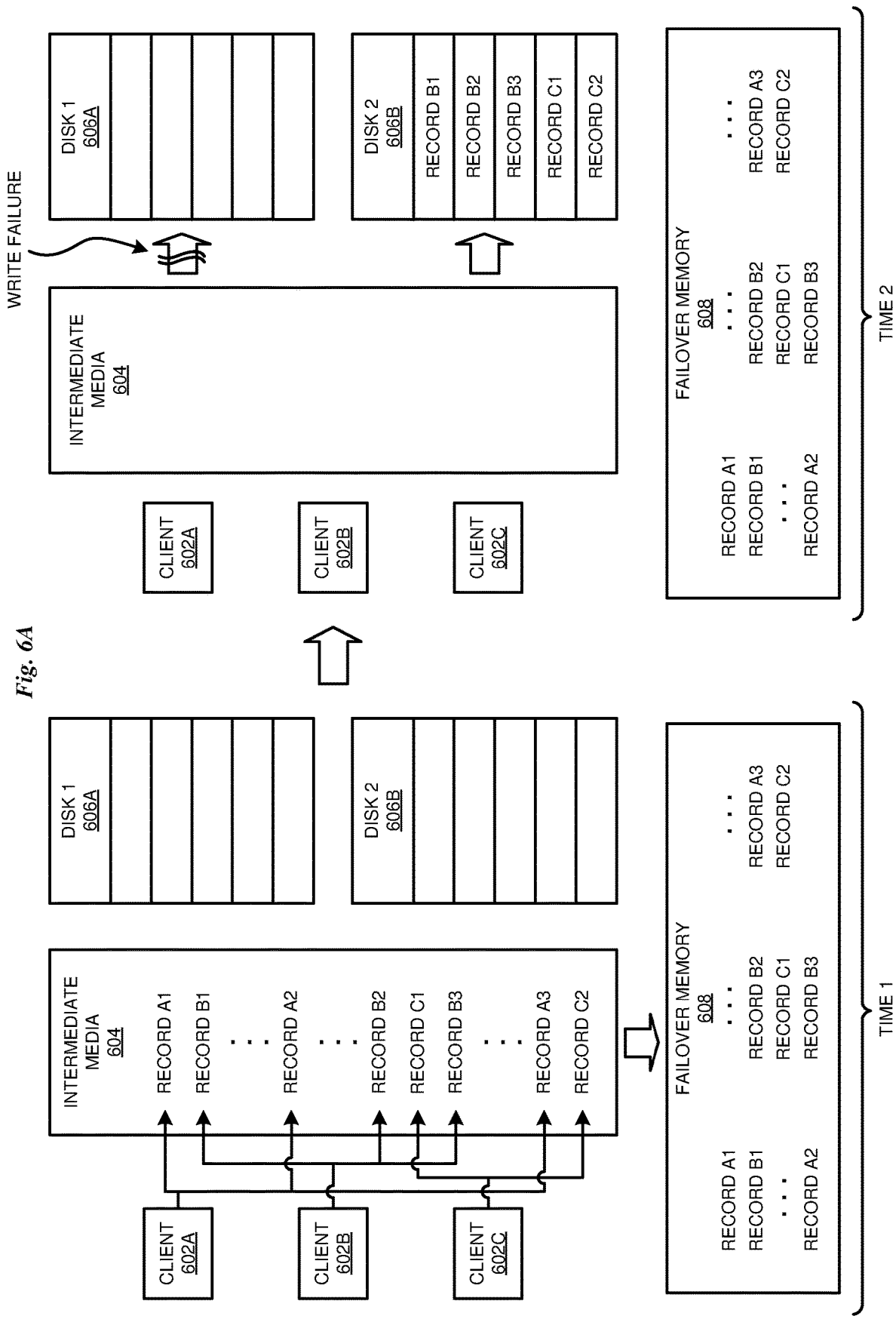
FIG. 6A depicts a block diagram of write and failover operations performed by the data correlation system during first and second time intervals in accordance with an illustrative embodiment.
Figure 6B:
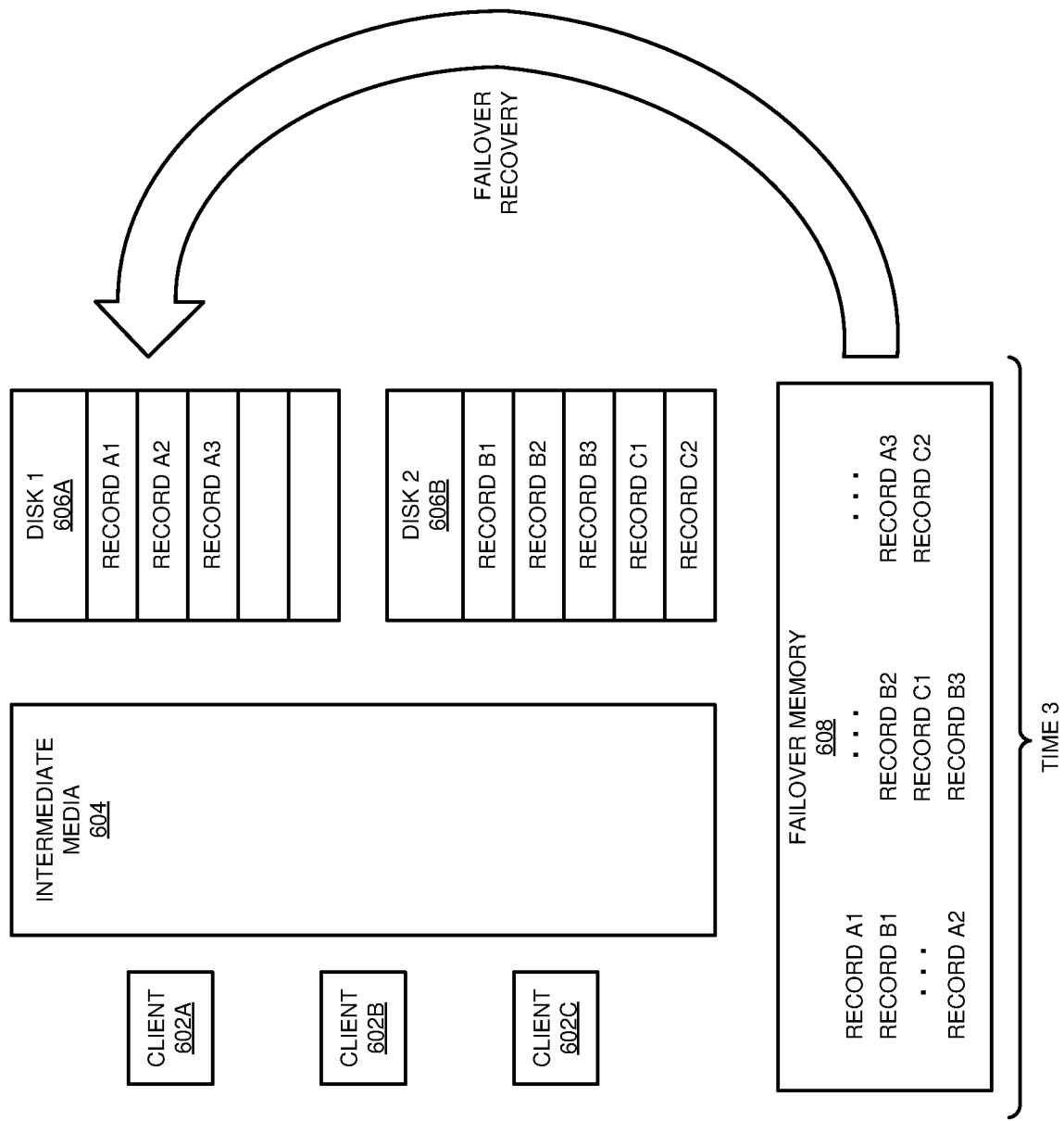
FIG. 6B depicts a block diagram of write and failover operations performed by the data correlation system during a third time interval in accordance with an illustrative embodiment.

With reference to FIGS. 6A-6B, these figures depict a block diagram of write and failover operations performed by the data correlation system 400 during first, second, and third time intervals in accordance with an illustrative embodiment. In a particular embodiment, clients 602A-602C are examples of applications 308 of FIG. 3, intermediate media 604 is an example of intermediate storage media 416 of FIG. 4, disks 606A-606B are examples of data storage locations for the database 420 of FIG. 4, and failover memory 608 is an example of memory device 422 of FIG. 4.

In the illustrated embodiment, during the first time interval shown as TIME 1, the data correlation system 400 receives write requests from clients 602A-602C. Responsive to the write requests, the data correlation system 400 performs the corresponding write operations by writing records A1-A3, B1-B3, and C1-C2 to the intermediate storage media 604 rather than directly to the database disks 606A-606B. In the illustrated embodiment, the data correlation system 400 also writes a copy of each of the records A1-A3, B1-B3, and C1-C2 to the failover memory 608 as failover copies of records A1-A3, B1-B3, and C1-C2. As records are written to the intermediate storage media 604, the record regroup manager 412 of FIG. 4 searches for correlations that apply to the records stored in the intermediate storage media 604 and organizes the correlated records into groups. In the illustrated embodiment, the record regroup manager 412 identifies a correlation between records A1-A3, identifies a correlation between records B1-B3, and identifies a correlation between records C1 and C2.

In the illustrated embodiment, during the second time interval shown as TIME 2, the data correlation system 400 moves the records from the intermediate storage medium 604 to the database disks 606A-606B. As illustrated, the data correlation system 400 writes the records to the disks 606A-606B in groups according to the correlations identified during the first time interval. Thus, the data correlation system 400 selects locations on the database disk 606A for storing records A1-A3 together, selects locations on the database disk 606B for storing records B1-B3 together, and selects locations on the database disk 606B for storing records C1-C2 together. However, the failover copies of records A1-A3, B1-B3, and C1-C2 are retained in the failover memory 608.

Referring specifically to FIG. 6B, during a third time interval shown as TIME 3, the data correlation system 400 monitors the database for errors and provides the failover copies of records as needed to resolve database errors. As a non-limiting example, the illustrated embodiment shows the data correlation system 400 detects a database error involving writing records A1-A3 to the disk 606A that occurred during the second time interval. Responsive to detecting the error, the data correlation system 400 provides the failover copies of records A1-A3 from the failover memory 608 to disk 606A in order to resolve the database error.

Figure 7:
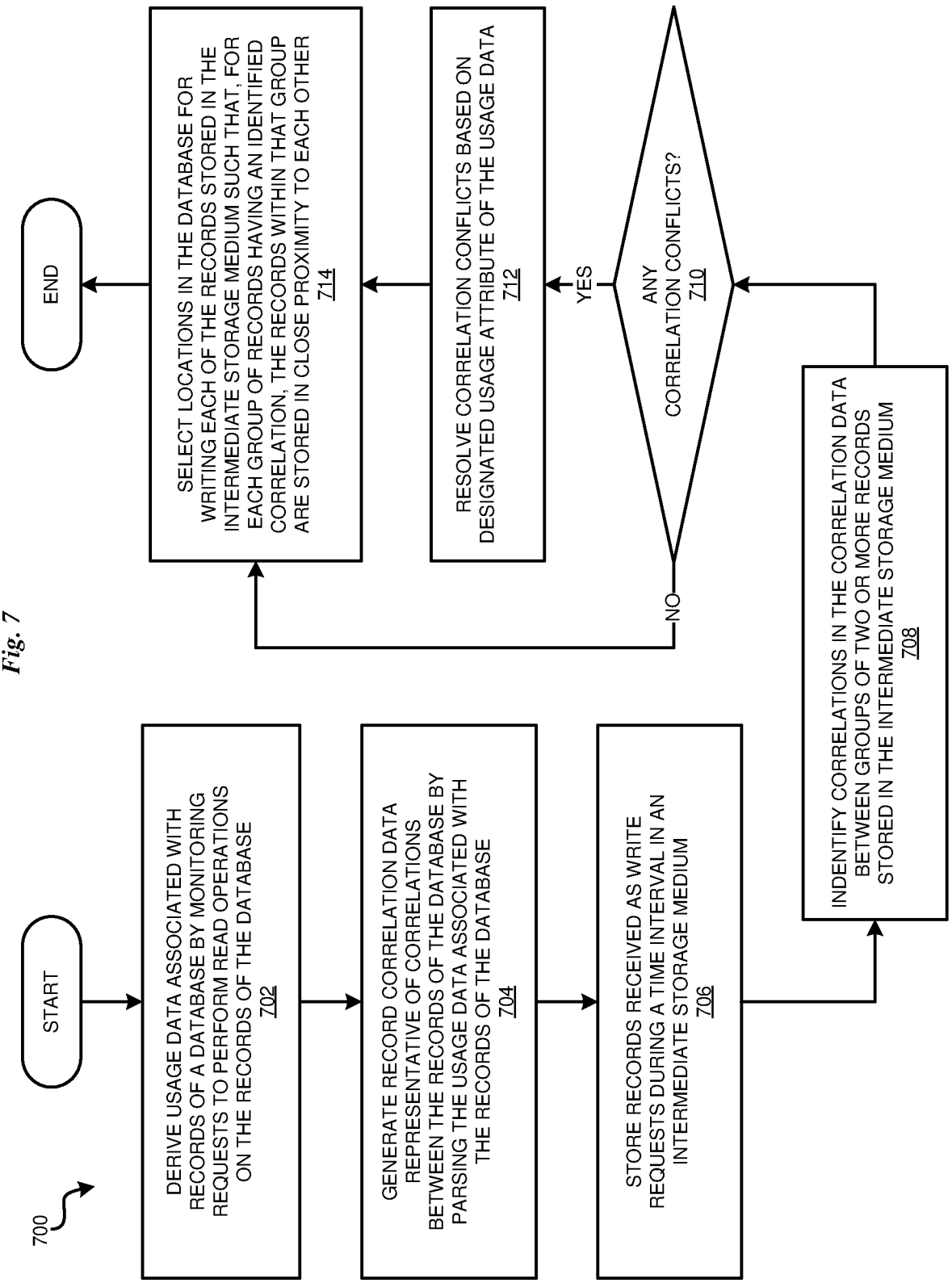
FIG. 7 depicts a flowchart of an example process for database optimization using record correlation and intermediate storage media in accordance with an illustrative embodiment.

With reference to FIG. 7, this figure depicts a flowchart of an example process 700 for database optimization using record correlation and intermediate storage media in accordance with an illustrative embodiment. In a particular embodiment, the data correlation system 400 carries out the process 700.

In an embodiment, at block 702, the process derives usage data associated with records of a database by monitoring requests to perform read operations on the records of the database. In some embodiments, the process receives and parses read requests. In some embodiments, the parsing includes performing one or more checks to determine the validity of a read request, such as a syntax check to determine if the read request has proper syntax, and/or a semantic check to determine if the read request is meaningful (e.g., determine if a table named in the request exists). In some such embodiments, the process determines database elements involved in the request, such as table names, data fields, key values, etc., for deriving the usage data.

Next, at block 704, the process generates record correlation data representative of correlations between the records of the database by parsing the usage data associated with the records of the database. In some embodiments, the correlations include interdependence or associations between two or more records that are quantitative or qualitative in nature and may or may not involve a causal relationship between the records. In some embodiments, process detects correlations based on the derived usage data. In some embodiments, the process derives the usage data by collecting statistics indicative of usage patterns associated with groups of records. In some such embodiments, the usage patterns include one or more record attributes that serve as the basis for the detected correlation. For example, in some embodiments, a usage pattern includes a frequency at which a group of records are accessed together or proximate to each other in a recognizable pattern. Thus, in some such embodiments, a group of data records that have repeatedly been retrieved together in response to a query or in response to a plurality of queries that are time-wise in close proximity to each other are designated as being correlated data records. Also, in some embodiments, the process characterizes correlations between data records based on a perceived correlation strength. In such embodiments, a given record may have two or more detected correlations with different data records that are disparately stored. In such a situation, a correlation conflict arises between the two or more detected correlations for the given record when determining where to store the given record. In such embodiments, the respective strengths of the two or more correlations are compared and the given record is stored in close proximity to other records associated with the strongest of the correlations. In some embodiments, the process stores the usage patterns associated with the detected correlations in a usage pattern repository on a computer readable storage medium. In some embodiments, the process also stores strength values associated with the detected correlations in the usage pattern repository.

Next, at block 706, the process stores a plurality of records received as respective write requests during a first time interval in an intermediate storage medium. In some embodiments, the process receives and parses the write requests. In some embodiments, the parsing includes performing one or more checks to determine the validity of a write request, such as a syntax check to determine if the read request has proper syntax, and/or a semantic check to determine if the read request is meaningful (e.g., determine if a table named in the request exists). The process then writes the record associated with the write request to the intermediate storage media. In some embodiments, the process allocates a buffer in a computer readable storage medium for use as the intermediate storage medium. In some embodiments, the process allocates a portion of a computer readable storage medium as a virtual disk for use as the intermediate storage media.

Next, at block 708, the process identifies a correlation in the correlation data between a first record of the plurality of records and a second record of the plurality of records. In some embodiments, as records are written to the intermediate storage media, the process searches the usage pattern repository for correlations that apply to the records stored in the intermediate storage media. In some embodiments, the process identifies correlations in the usage pattern repository by searching the usage patterns in the usage pattern repository for record attributes that are applicable to two or more of the records stored in the intermediate storage media. As the process identifies correlations that apply to the records stored in the intermediate storage media, the process organizes the applicable records into groups.

Next, at block 710, the process determines whether any correlation conflicts exist in which a record is correlated with more than one group of other records. If so, then at block 712 the process resolves any detected correlation conflicts based on designated usage attribute of the usage data. In some embodiments, the designated usage attribute of the usage data is used to determine a perceived strength of the correlation. In such embodiments, the respective strengths of the two or more correlations are compared and the record is stored in close proximity to other records associated with the strongest of the correlations.

Next, at block 714, the process selects locations in the database for writing each of the records stored in the intermediate storage medium such that, for each group of records having an identified correlation, the records within that group are stored in close proximity to each other. In some embodiments, during a second time interval that immediately follows the first time interval, the process moves the records that were stored in the intermediate storage medium during the first time interval to the database. The process writes the records to the database in groups according to the identified correlations. For example, in some embodiments the process selects locations in the database for storing grouped records such that the grouped records will be stored in close proximity to each other. In other words, the process selects locations for grouped records based on a proximity of each of the selected locations to each other so as to store the correlated records in close proximity to each other in the database.

In some embodiments, the process also provides failover functionality. In such embodiments, the process copies each record written to the intermediate storage media to failover memory as a failover copies of the records. In such embodiments, the process monitors the database for errors. If the process detects a database error involving records having a failover copy in the failover memory, the process resolves the database error by providing the corresponding failover copy of the affected record(s) to the database. In some embodiments, the failover memory comprises a computer readable storage medium. In some embodiments, the process writes the failover copies to the failover memory during the first time interval as records are written to the intermediate storage media. In alternative embodiments, the process writes the failover copies to the failover memory during the second time interval as records are written to the database.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM) or Flash memory, a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    deriving usage data associated with records of a database by monitoring requests to perform read operations on the records of the database, the records of the database being stored using a plurality of data blocks in a database storage medium;
    generating record correlation data representative of correlations between respective groups of records of the database by parsing the usage data associated with the records of the database;
    storing a plurality of records received as respective write requests during a first time interval in an intermediate storage medium, the intermediate storage medium being distinct from the database storage medium;
    identifying a correlation in the record correlation data between a first record of the plurality of records and a second record of the plurality of records; and
    selecting, responsive to identifying the correlation, a first data storage location (first location) in the database storage medium for writing the first record and a second data storage location (second location) in the database storage medium for writing the second record based on a proximity of the first location to the second location in the database storage medium such that a physical distance between the first location and the second location is smaller than a second distance when the first record and the second record are written to the database storage medium in a write-order of write requests of the first and the second records.

2. The method of claim 1, wherein the deriving of usage data comprises collecting statistics indicative of usage patterns associated with respective groups of records, wherein each usage pattern includes a record attribute of a corresponding group of records.

3. The method of claim 2, wherein at least one of the usage patterns includes a frequency at which records of a corresponding group of records are accessed together.

4. The method of claim 2, wherein the generating of record correlation data comprises calculating strength values for respective usage patterns.

5. The method of claim 4, wherein the calculating of each strength value is based at least in part on whether the record attribute of the respective usage pattern includes a key value.

6. The method of claim 4, further comprising storing the usage patterns and associated strength values in a usage pattern repository on a computer readable storage medium.

7. The method of claim 6, wherein the identifying of the correlation in the record correlation data comprises searching the usage patterns in the usage pattern repository for record attributes applicable to both the first record and the second record.

8. The method of claim 1, further comprising allocating a buffer in a computer readable storage medium, wherein the intermediate storage medium comprises the buffer.

9. The method of claim 1, further comprising allocating a portion of a computer readable storage medium as a virtual disk, wherein the intermediate storage medium comprises the virtual disk.

10. The method of claim 1, further comprising writing failover records as a failover copy of the plurality of records from the intermediate storage medium to a failover memory prior to writing the plurality of records to database files, wherein the failover memory comprises a computer readable storage medium.

11. The method of claim 10, further comprising detecting a database error involving at least one record having a corresponding failover record in the failover memory, and resolving the database error using the corresponding failover record.

12. The method of claim 1, further comprising moving, during a second time interval that begins after the end of the first time interval, the plurality of records stored in the intermediate storage medium to the database in groups of records according to identified correlations.

13. A computer program product comprising one or more computer readable storage media, and program instructions collectively stored on the one or more computer readable storage media, the program instructions executable by a processor to cause the processor to perform operations comprising:
    deriving usage data associated with records of a database by monitoring requests to perform read operations on the records of the database, the records of the database being stored using a plurality of data blocks in a database storage medium;

generating record correlation data representative of correlations between respective groups of records of the database by parsing the usage data associated with the records of the database;

storing a plurality of records received as respective write requests during a first time interval in an intermediate storage medium, the intermediate storage medium being distinct from the database storage medium;

identifying a correlation in the record correlation data between a first record of the plurality of records and a second record of the plurality of records; and selecting, responsive to identifying the correlation, a first data storage location (first location) in the database storage medium for writing the first record and a second data storage location (second location) in the database storage medium for writing the second record based on a proximity of the first location to the second location in the database storage medium such that a physical distance between the first location and the second location is smaller than a second distance when the first record and the second record are written to the database storage medium in a write-order of write requests of the first and the second records.

14. The computer program product of claim 13, wherein the stored program instructions are stored in a computer readable storage device in a data processing system, and wherein the stored program instructions are transferred over a network from a remote data processing system.

15. The computer program product of claim 13, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

16. The computer program product of claim 13, wherein the deriving of usage data comprises collecting statistics indicative of usage patterns associated with respective groups of records, wherein each usage pattern includes a record attribute of a corresponding group of records.

17. The computer program product of claim 16, wherein the generating of record correlation data comprises calculating strength values for respective usage patterns.

18. The computer program product of claim 17, the operations further comprising storing the usage patterns and associated strength values in a usage pattern repository on a computer readable storage medium,
wherein the identifying of the correlation in the record correlation data comprises searching the usage patterns in the usage pattern repository for record attributes applicable to both the first record and the second record.

19. A computer system comprising a processor and one or more computer readable storage media, and program instructions collectively stored on the one or more computer readable storage media, the program instructions executable by the processor to cause the processor to perform operations comprising:
deriving usage data associated with records of a database by monitoring requests to perform read operations on the records of the database, the records of the database being stored using a plurality of data blocks in a database storage medium;

generating record correlation data representative of correlations between respective groups of records of the database by parsing the usage data associated with the records of the database;

storing a plurality of records received as respective write requests during a first time interval in an intermediate storage medium, the intermediate storage medium being distinct from the database storage medium;

identifying a correlation in the record correlation data between a first record of the plurality of records and a second record of the plurality of records; and selecting, responsive to identifying the correlation, a first data storage location (first location) in the database storage medium for writing the first record and a second data storage location (second location) in the database storage medium for writing the second record based on a proximity of the first location to the second location in the database storage medium such that a physical distance between the first location and the second location is smaller than a second distance when the first record and the second record are written to the database storage medium in a write-order of write requests of the first and the second records.

20. The computer system of claim 19, wherein the deriving of usage data comprises collecting statistics indicative of usage patterns associated with respective groups of records, wherein each usage pattern includes a record attribute of a corresponding group of records.

* * * * *